Patented Sept. 18, 1923.

1,468,234

UNITED STATES PATENT OFFICE.

GEORGE W. HEISE, OF ELMHURST, NEW YORK, ASSIGNOR TO UNION CARBIDE & CARBON RESEARCH LABORATORIES, INC., A CORPORATION OF NEW YORK.

DEPOLARIZER AND PROCESS OF PREPARING THE SAME.

No Drawing.     Application filed December 14, 1921. Serial No. 522,423.

*To all whom it may concern:*

Be it known that I, GEORGE W. HEISE, a citizen of the United States, residing at Elmhurst, in the county of Queens and State of New York, have invented certain new and useful Improvements in Depolarizers and Processes of Preparing the Same, of which the following is a specification.

This invention relates to improvements in sulfur-containing copper oxid depolarizers for cells having a caustic alkali electrolyte. It is the principal object of the invention to provide depolarizing masses of sulfur-containing copper oxid including an ammoniacal ingredient capable of improving the service characteristics of the cell.

It is known from the disclosure of United States Patent 1,282,057, granted to R. W. Erwin on October 22, 1918, that the addition of sulfur to copper oxid depolarizers results in a material increase in the voltage and service life of cells in which such depolarizers are used. According to my invention improved copper oxid depolarizers are formed by associating the fragmentary or granular oxid with sulfur and an ammonium compound, and subjecting the resulting mixture to regulated heat. Cells provided with copper oxid depolarizers containing an ammonium compound, as well as sulfur, show service characteristics superior to those in which merely sulfured oxid depolarizers are used. The association of nitrogenous materials, particularly ammonium compounds, with sulfur-containing copper oxid, is the joint invention of Clarence W. Brokate and myself, and is claimed broadly in our application Serial No. 522,387 filed of even date herewith.

In the following description, the term "high voltage depolarizer" will be used for brevity to designate copper oxid depolarizer combined or associated with sulfur or sulfur compounds.

In one embodiment of the invention the following preferred procedure may be adopted: Granular copper oxid is mixed with raw sulfur and an ammonium salt, which may be ammonium sulfate. The mixture is then heated to a temperature somewhat above that at which the sulfur and ammonium compound become plastic or melt. This may be done without substantial loss of sulfur and ammonium salt. The proportions of the ingredients may be considerably varied, but the following is a mixture which can be used to good advantage, the parts being by weight:

| | Parts. |
|---|---|
| Copper oxid | 100.0 |
| Sulfur | 1.2 |
| Ammonium sulfate | 2.5 |

The sulfate is preferably added in water solution, to facilitate mixing. The range of temperature is between 125° and 225° C. The time of heating is somewhat dependent on the temperature, decreasing as the temperature rises. Long heating, especially above 200° C., should be avoided. A preferable procedure is to heat the mixture with stirring for two hours at 160° C. I am unable to say what reactions take place during the heating, but the results are much superior to those obtained by merely mixing the ingredients at room temperature. The sulfur-containing material will usually be in nodular form and will require crushing before packing into the containers.

Copper oxid prepared electrolytically, by the extraction of a copper-containing material with ammonia or in other suitable ways, as well as scale oxid, may be used. Other ammonium salts, for example the chloride and acetate, may be substituted for the sulfate.

The above-described procedure is preferable, but good results may also be obtained by bonding high voltage copper oxid with an ammonium salt. Various other methods may be followed, such, for example, as mixing the oxid first with an ammonium salt in a state of fusion and then stirring melted sulfur into the resulting mixture.

In cells of the zinc-alkali-copper oxid type, it is usual to provide depolarizer protecting means, which may be in the form of a perforated metal container surrounding the oxid, or other suitable devices. Depolarizers prepared according to the foregoing methods will in general be so protected.

Considerable difficulty is found in preventing the copper oxid of ordinary depolarizers from sifting through the container perforations. I have discovered that by heating a mixture of copper oxid and sulfur, with or without an ammonium compound, while within the container itself, a depolarizing electrode substantially free from this defect is obtained. It is preferred to use a composition comprising copper oxid, sulfur, and ammonium sulfate in substantially the proportions above given. The mixture should contain a relatively large proportion of water, as this tends to produce a bonded mass of considerable coherence.

A perforated metal container of suitable type, such as the tinned iron containers now in common use, is filled with the composition. Heat is then applied until the salt and sulfur become plastic or fuse. On cooling the container and its contents, it will be found that the oxid particles are cemented together with sufficient firmness to prevent any loss through the perforations and that the mass is also adherent to the container. The depolarizing electrode so prepared has improved service characteristics due to the influence of the ammonium compound associated with the oxid.

In some cases it is desirable that the depolarizer should have sufficient coherence to make it self-sustaining in service. It has heretofore been proposed, in this connection, to obtain the advantages due to the presence of sulfur and at the same time to make use of its bonding properties in forming copper oxid into a coherent mass. According to one embodiment of my invention, coherent plates or blocks of high voltage oxid are prepared. Such depolarizing masses are distinguished from those of the prior art by having an ammonium salt incorporated therein. The following specific example is illustrative: Copper oxid, intimately mixed with sulfur, is moistened with a water solution of ammonium sulfate and the mixture is thoroughly stirred and compressed into plates. These may be baked at approximately 150° C. for five hours or thereabout. The preferred proportions of the ingredients are those above tabulated.

Plates prepared in this manner need not be encased in metal, as they are strongly coherent and do not disintegrate during service.

In another embodiment of my invention, the improved depolarizing composition is used as an external layer only. The main bulk of the depolarizer may be copper oxid containing no ammonia. High voltage oxid is preferred. For example, a perforated container is lined with a plastic composition comprising copper oxid, sulfur and ammonium sulfate, in substantially the proportions specified above. Then the residual space in the container is filled with high voltage oxid, which is packed in under suitable pressure.

The layer of ammonia containing a high voltage oxid applied as described is preferably baked in the container, according to the process outlined above. In this way a coherent covering for the perforations is obtained, preventing the oxid particles from passing through them. A thin layer is adequate. As the beneficial effect of the ammonia-containing depolarizer is especially desirable during the early stages of the life of the cell, a quantity which will be reduced within a comparatively brief time will nevertheless give many of the advantages of a depolarizer consisting exclusively of the improved composition.

Ammonia and sulfur containing copper oxid masses of the types disclosed herein are efficient depolarizers. Cells in which they are used give a voltage somewhat higher than that obtainable from cells having non-sulfured oxid depolarizer, the voltage is substantially constant, irrespective of variations in the current drain to which the cell may be subjected, and is maintained through a long service life.

The term "sulfur" is used in the appended claims in a sense which includes not only elemental sulfur but also all such sulfur compounds as have the property of imparting high voltage characteristics to copper oxid.

I claim:—

1. A process of preparing high voltage depolarizer having improved service characteristics, comprising mixing copper oxid with sulfur and an ammonium salt, and heating the mixture.

2. A process of preparing high voltage depolarizer having improved service characteristics, comprising mixing copper oxid with sulfur and ammonium sulfate, and heating the mixture until the sulfur becomes plastic.

3. A process of preparing high voltage depolarizer having improved service characteristics, comprising mixing an ammonium salt with sulfur-containing copper oxid, and heating the mixture.

4. A process of preparing a non-sifting high voltage depolarizing electrode, comprising mixing copper oxid with sulfur, placing the mixture in a container adapted to be inserted in a cell, and heating the container until the sulfur becomes plastic.

5. A process of preparing a non-sifting high voltage depolarizing electrode having improved service characteristics, comprising mixing copper oxid with sulfur and an ammonium salt, placing the mixture in a container adapted to be inserted in a cell, and heating the container until the sulfur and sulfate become plastic.

6. A process of preparing a non-sifting high voltage depolarizer for filling into a perforated container, comprising mixing copper oxid with sulfur, agglomerating the mixture by heating until the sulfur becomes plastic and then cooling, and granulating the agglomerated mass, the granules being of greater dimensions than the perforations.

7. A process of preparing a coherent high voltage depolarizer having improved service characteristics, comprising mixing copper oxid with sulfur and an ammonium salt, shaping the mixture, and subjecting the shaped mass to heat sufficient to cause the bonding of the particles of the mixture.

8. A process of preparing a depolarizing electrode having improved service characteristics, comprising forming a layer of ammonia-containing high voltage oxid upon the interior surface of a perforated container, and filling the residual space in said container with depolarizing material containing copper oxid.

9. A process of preparing a coherent high voltage depolarizer having improved service characteristics, comprising mixing copper oxid with sulfur and ammonium sulfate, shaping the mixture, and baking the shaped mass at about 150° C.

10. High voltage depolarizer having improved service characteristics, comprising sulfur-containing copper oxid and an ammonium salt melted thereupon.

11. High voltage depolarizer having improved service characteristics, comprising about 100 parts copper oxid, 1.2 parts sulfur, and 2.5 parts ammonium sulfate, said sulfur and sulfate having solidified upon the oxid from a state of fusion.

12. A non-sifting high voltage depolarizing electrode, comprising a container adapted to be inserted in a cell, and a coherent mass of sulfur-containing oxid adherent to said container.

13. A non-sifting high voltage depolarizing electrode, comprising a container adapted to be inserted in a cell, and a coherent mass of copper oxid containing an ammonium salt and sulfur adherent to said container.

14. A non-sifting depolarizing electrode, comprising a perforated container adapted to be inserted in a cell, a coating of high voltage oxid on the interior surface of said container, and copper oxid depolarizing material within the said coating.

15. A cell of the zinc-alkali-copper oxid type, comprising a depolarizer containing copper oxid, sulfur and an ammonium salt.

In testimony whereof, I affix my signature.

GEORGE W. HEISE.